UNITED STATES PATENT OFFICE.

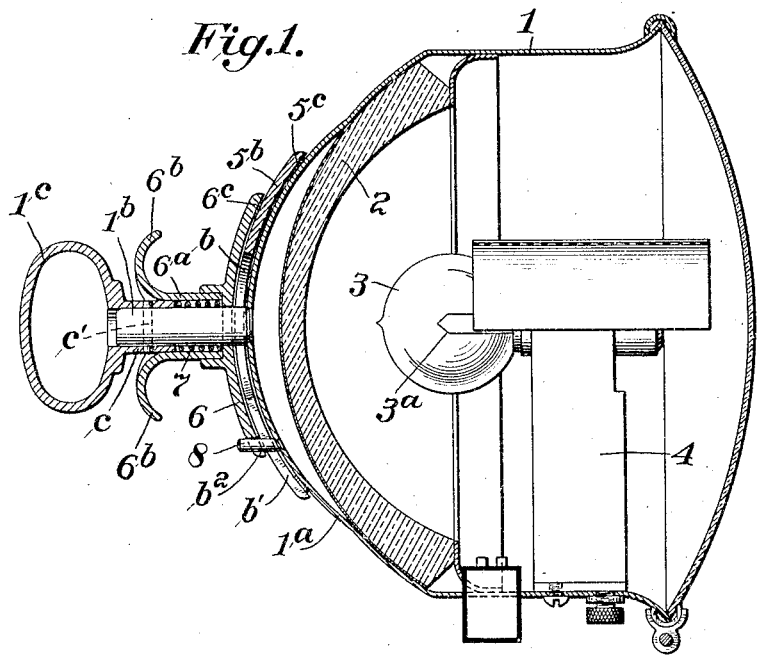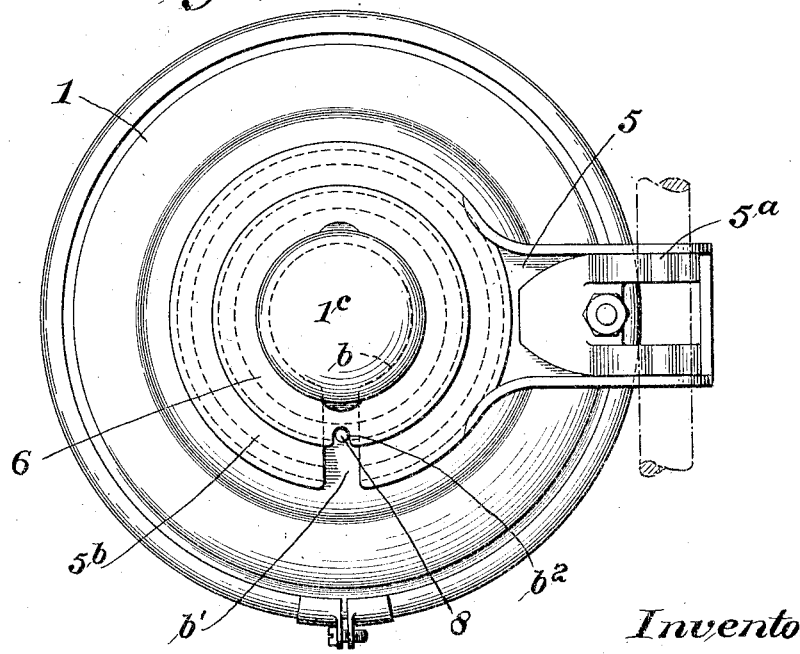

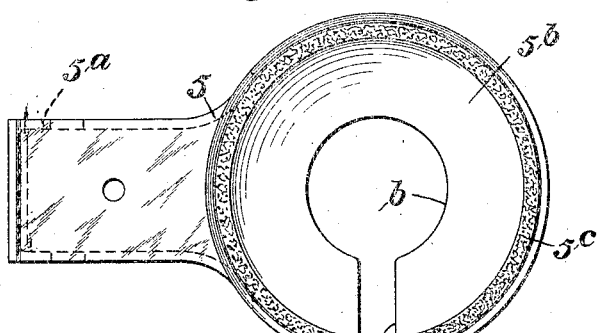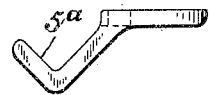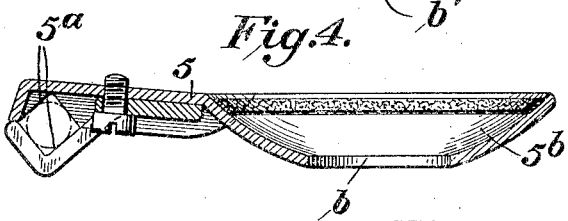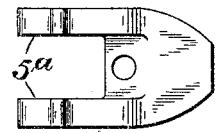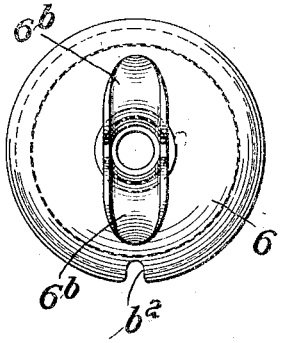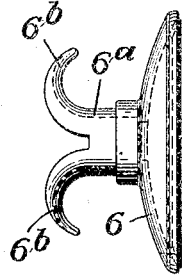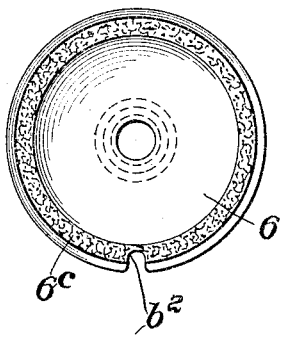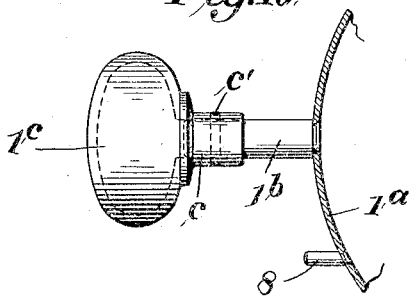

STATES LEE LEBBY, OF SAVANNAH, GEORGIA.

SPOTLIGHT.

1,408,104.

Specification of Letters Patent.  Patented Feb. 28, 1922.

Application filed February 7, 1921. Serial No. 443,196.

*To all whom it may concern:*

Be it known that I, STATES LEE LEBBY, a citizen of the United States, and a resident of Savannah, in the county of Chatham and State of Georgia, have invented certain new and useful Improvements in Spotlights, of which the following is a specification.

My present invention relates to improvements in search lights or projectors and is designed more particularly for embodiment in what is commonly known as "spot lights" which are largely used on motor vehicles for illuminating the side of the road. It is not limited to such use however, being advantageous in other situations, as for example on motor boats.

The invention aims to provide a simple, economical, durable, and efficient form of projector which can be readily adjusted to throw the beam of light in a limited direction and which, when so adjusted, will be firmly held in position so as not to be accidentally displaced by the vibration or jars of the vehicle.

A further object is to provide a construction which will enable the lamp to be readily detached from its supporting bracket and used as a trouble light, and as easily replaced.

With these and other objects in view the invention includes the novel features of construction and arrangement and combination of parts hereinafter described and particularly defined by the appended claims.

An embodiment of my invention is illustrated in the accompanying drawings in which—

Figure 1 is a vertical section taken centrally through a complete lamp or projector.

Figure 2 is a rear view.

Figures 3, 4, 5 and 6 are detail views of the bracket and clamping means.

Figures 7, 8 and 9 are detail views of the follower.

Figure 10 is a detail view of the stem and handle with a portion of the lamp casing in section.

Referring by reference characters to these drawings the numeral 1 designates the lamp or projector as a whole which, except as hereinafter specified, may be of the ordinary or any desired type, though I have shown as my preferred form of lamp one having a compensated lens reflector or mirror 2 and light filament $3^a$ such as forms the subject of an application filed by me on the seventh day of December, 1920, Serial Number 428,917.

The light bulb 3 may be supported in any desired manner, but I have illustrated it herein as supported by improved focusing standard 4 which forms the subject of another application filed by me on the 7th day of February, 1921, Serial No. 443,197.

The back or rear wall of the lamp or projector casing is made of spherical curvature as indicated at $1^a$ and carries a rigid rearwardly projecting stud or member $1^b$, preferably of tubular formation, which is provided at its outer extremity with a handle $1^c$.

The supporting bracket is indicated at 5 and is provided at an end with any suitable clamp or holding means $5^a$ for securing it to the wind shield, car body, or other support in connection with which the projector is to be used.

This bracket carries at its opposite end a concavo-convex portion $5^b$ of a spherical curvature corresponding to the curvature of the rear wall $1^a$ of the lamp casing.

The body of the bracket may be conveniently formed of sheet metal which enables the concavo-convex portion to be readily shaped by pressing, through the use of suitable dies.

The concavo-convex portion is provided with a central opening $b$, which is designed to permit the passage of the stud $1^b$, and which is considerably larger in diameter than said stud to permit lateral movement of the stud in all directions while retained in said opening. The concavo-convex portion is also provided with a lateral slot $b^1$ leading from the central opening to the edge of the bracket, which slot is of just sufficient size to permit the passage of the stud when it is desired to remove the lamp from the bracket for use as a trouble lamp.

In order to hold the lamp normally clamped to the bracket, I provide a follower plate 6 of a spherical curvature corresponding to that of the convex side of the bracket.

A spring 7 is provided which tends to draw the follower plate and lamp casing towards each other, thereby clamping the concavo-convex portion of the bracket between them, and holding the projector rigidly in position. At the same time it will be readily observed that if the pressure of the spring be slightly relieved the lamp may be positioned to direct the light in any direction within the limits permitted by the large opening in the bracket, a universal motion of adjustment being permitted by the coacting spherical surfaces. I prefer to provide the handle 1ᶜ with a tubular portion c which is secured to the stud 1ᵇ by a pin c¹ and to provide the follower plate with a tubular guide member 6ᵃ which may be secured thereto by sweating or other convenient manner and has its outer portion telescopically engaging the tubular portion c, and with the spring 7 in the shape of a helical coil lying between the guide member 6ᵃ and the stud, and bearing at its outer end against the end of the handle tube c and at its inner end against the follower plate, being held in compression between said members.

The guide member 6ᵃ of the follower plate is provided with finger receiving projections 6ᵇ in convenient position to be engaged by two of the fingers of the hand which grasps the handle, so that by a slight pressure of the fingers the pressure of the spring may be relieved sufficiently to enable the adjustment hereinbefore described to be readily effected. A simple relaxation of the fingers causes the lamp to be automatically locked or clamped in adjusted position and firmly held until further adjustment is desired.

To remove the lamp from the bracket to enable it to be used as a trouble lamp, it is only necessary to exert enough pressure on the spring to remove all clamping action and simultaneously move the lamp in a direction to cause the stud 1ᵇ to pass through the slot in the bracket. The lamp may be as easily and quickly repositioned on the bracket by a similar operation.

The coacting faces of the spherical portions may be provided with annular rings or washers of yielding material as indicated at 5ᶜ and 6ᶜ to secure an easy yielding and uniform tension or degree of engagement between the parts.

A pin 8 is provided on the spherical portion 1ᵃ of the lamp casing to engage the slot b¹ in the bracket and also a slot b² in the follower plate 6 to maintain the bulb standard substantially vertical, while the lamp is supported by the bracket.

Having thus described my invention what I claim is—

1. A lamp or projector having a back wall of spherical curvature and a projecting stud, a supporting bracket having a concavo-convex portion with the concavity thereof fitting said spherical back wall, said concavo-convex portion having an opening of larger diameter than the stud through which said stud projects, a handle on said stud, spring means for holding the coacting surfaces of the lamp casing and bracket in frictional engagement, and means positioned adjacent said handle for relieving the action of the spring.

2. A lamp or projector having a back wall of spherical curvature and a projecting stud, a supporting bracket having a concavo-convex portion with the concavity thereof fitting said spherical back wall, said concavo-convex portion having an opening of larger diameter than the stud through which said stud projects, a follower plate slidably guided relative to the stud and having a spherical face cooperating with the face of the bracket, a spring tending to force said stud and follower plate in opposite directions, and means for relieving the action of the spring.

3. A lamp or projector having a back wall of spherical curvature and a projecting stud, a supporting bracket having a concavo-convex portion with the concavity thereof fitting said spherical back wall, said concavo-convex portion having an opening of larger diameter than the stud through which said stud projects, a follower plate having a spherical face coacting with the convex portion of the bracket and having a tubular part slidable about said stud, a helical spring interposed between said tubular part and arranged to press said stud and tubular part in opposite directions, a handle on said stud, and finger grasping members carried by said tubular part adjacent the handle.

4. In combination a bracket having a bearing portion with a transverse slot therein, a lamp casing having a rear wall to coact with said bearing portion and a stud to project through said slot, a follower plate slidably positioned relative to said stud and having a face to coact with the rear face of the bracket, spring means tending to press said follower plate and stud in opposite directions, a handle on the stud, and finger grasping portions connected with the follower plate and positioned adjacent the handle.

In testimony whereof, I affix my signature.

STATES LEE LEBBY.